Feb. 26, 1952     A. E. MERRIWEATHER     2,587,190
FSHING FLOAT
Filed May 3, 1949
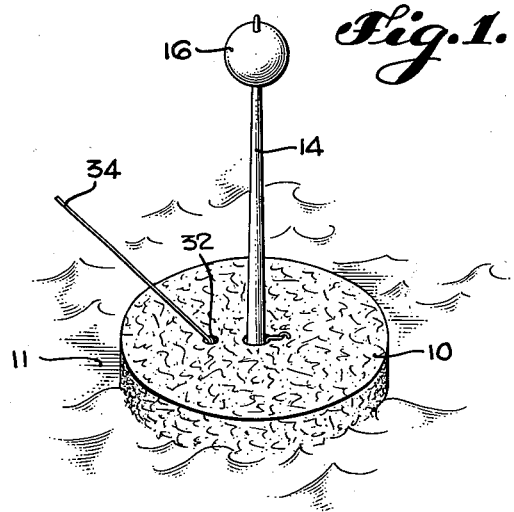
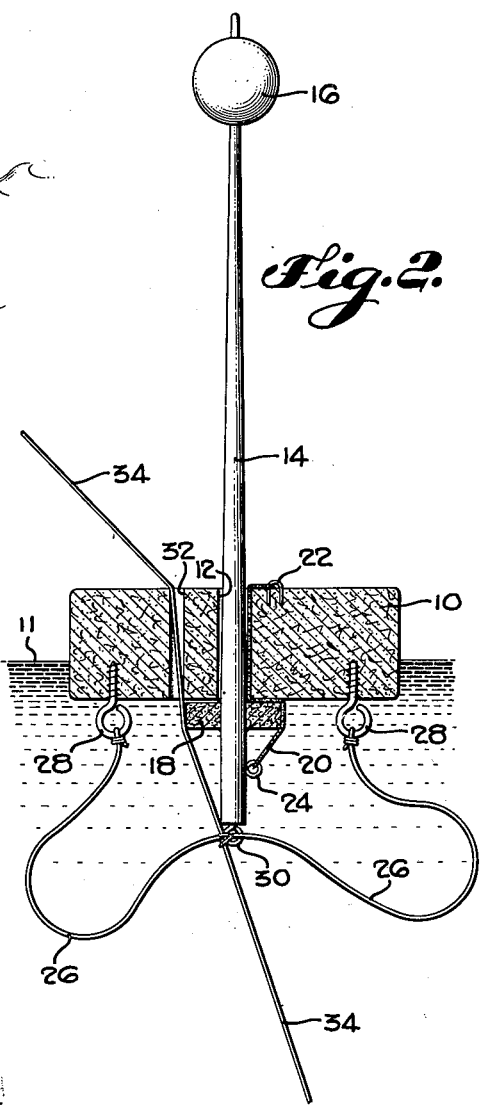
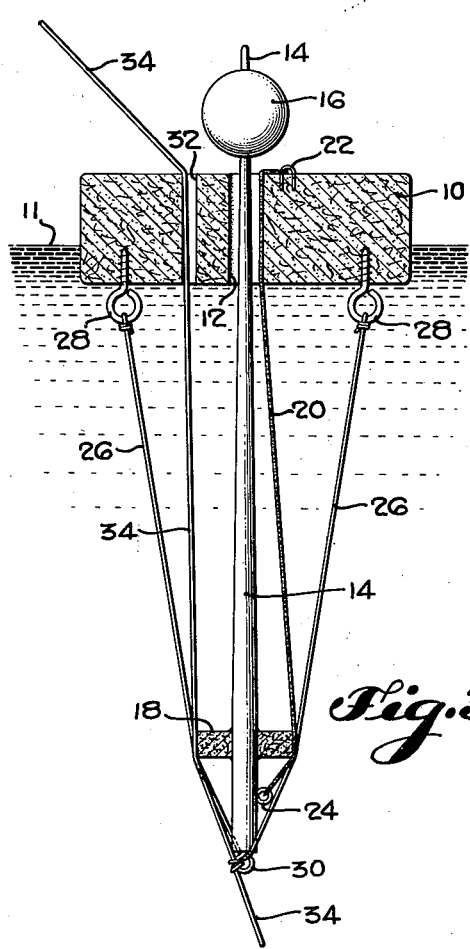
ARTHUR E. MERRIWEATHER,
INVENTOR.
BY
ATTORNEY Patented Feb. 26, 1952

2,587,190

UNITED STATES PATENT OFFICE 2,587,190

FISHING FLOAT

Arthur E. Merriweather, Los Angeles, Calif.

Application May 3, 1949, Serial No. 91,067

1 Claim. (Cl. 43—17)

My invention relates to fishing floats and is particularly adapted for use in fishing from rough waters, such as from an ocean going barge or other vessel.

It often happens in such fishing that the float to which the fishing line is attached will bob around in the rough waters and it will be difficult, if not impossible, for the fisherman to determine when a fish has been caught on the hook. With the present invention, no matter how rough the water and no matter how much the float bobs around, the fisherman will be able to ascertain whether or not a fish has been caught on his hook.

It is an object of this invention to provide a device for indicating to the fisherman when a strike has been made and when a fish has gotten away after the hook has caught him, either in the mouth or elsewhere.

It is another object of this invention to indicate the presence or absence of a fish on the fisherman's line in darkness as well as in daylight fishing.

It is another object of this invention to provide an economical fishing float that can be manufactured and sold at low cost.

Other objects and advantages of my invention will be apparent from the following description and claim, the novelty consisting in the features of construction, combination of parts, the unique relations of the members and the relative proportioning, disposition and operation thereof, all as is more completely outlined herein and as is particularly pointed out in the appended claim.

In the accompanying drawings, forming a part of this present application;

Figure 1 is a vertical side view of my fishing float, showing my preferred embodiment in its operative position before a fish is caught on the line.

Figure 2 is a vertical elevation, partly in section, showing my fishing float in the position shown in Figure 1.

Figure 3 is a vertical elevation of my fishing float, partly in section, showing the position assumed when a fish has been caught on the line.

Referring to the drawings, I will describe my fishing float and its method of operation.

A float member 10, preferably made of cork, balsa or other light wood that will float readily upon the surface of the water 11, is provided with a vertical signal post hole 12 through which a signal post 14 may move up and down when suitably actuated.

On top of my signal post 14 I may provide a signal post ball 16, which may be painted with luminous paint so as to be visible to the fisherman in the dark. Also, luminous paint is applied to the upper surfaces of the float 10 and the signal post 14.

Below the float 10 I mount a stop 18 at a point on signal post 14 that will permit the signal post 14 to extend upwardly through its hole 12 in float 10 the desired amount. This stop 18 is rigidly or integrally attached by any suitable means to signal post 14.

A resilient means, such as an ordinary elastic band, 20 is then connected to my float 10 by a suitable anchor 22 and to my post 14 by a suitable anchor 24.

This resilient means 20 causes my signal post 14 to be returned from the position shown in Figure 3 to the position shown in Figure 2 when the fish gets away from the hook.

A movement limiting line 26 attached by anchors 28 to the underneath side of float 10 is attached to the bottom of signal post 14 by attachment means 30. This movement limiting line 26 prevents the signal post 14 from being lost by being pulled completely through the hole 12.

A suitable fishing line hole 32 is provided vertically through float 10 and an ordinary fishing line 34 is threaded from the fishing pole, not shown, down through hole 32 to attachment means 30 at the bottom of signal post 14 where line 34 is attached by an ordinary knot, and thence line 34 proceeds downwardly to the hook, not shown, which is baited for the fish.

The method of operation of my invention is to thread the line 34 through hole 32, attaching it to attachment 30 and placing appropriate bait on the hook.

When a strike is made and the fish becomes impaled on the hook, either by biting it or through being hooked by it, the downward pull on line 34 causes post 14 and its attached signal ball 16 to be pulled downwardly to the lowermost extent of movement limiting line 26. The fisherman can see the relative position of ball 16 and the upper surface of float 10 and can immediately see that the fish has been caught on the hook. He will then begin to haul in his line and retrieve the fish in the usual manner.

On the other hand, should the fish get away the resilient means 20 will cause signal post 14 and its attached ball 16 to rise from the position shown in Figure 3 to the status shown in Figure 2 and the fisherman will know that, for some reason, the fish got away.

The luminous paint on the upper surface of the float 10, the post 14 and the entire surface of the ball 16 enables the fisherman to see the relative position of these parts in the dark and thus to conduct his fishing operations at night as efficiently and effectively as in the daytime.

It is to be understood that the form of my invention herein shown and described is my preferred embodiment and that various changes in the shape, size and the arrangement of parts may be resorted to without departing from the spirit of my invention or the scope of the appended claim.

I claim:

In a fishing float the combination of a float member, a signal member movably mounted in said float member, said float having a vertical passageway through it, a fishing line threaded through said passageway and fixedly attached to said signal member at a point below the bottom of the float, an elastic band connecting said float and signal members so that movement of the said members apart will stretch said elastic band, and a stop member mounted on said signal member below said float member.

ARTHUR E. MERRIWEATHER.

REFERENCES CITED

The following references are of record in the file of this patent:

UNITED STATES PATENTS

| Number | Name | Date |
|---|---|---|
| 729,444 | Strasser | May 26, 1903 |
| 1,241,707 | Capooch et al. | Oct. 2, 1917 |
| 1,504,065 | Lower | Aug. 5, 1924 |
| 1,816,235 | Schroeder | July 28, 1931 |
| 1,950,933 | Snell | Mar. 13, 1934 |
| 1,989,407 | Ezell | Jan. 29, 1935 |

FOREIGN PATENTS

| Number | Country | Date |
|---|---|---|
| 15,097 | Great Britain | Nov. 17, 1884 |
| 294,347 | Great Britain | July 26, 1928 |
| 474,642 | Great Britain | Nov. 4, 1937 |